No. 730,901. PATENTED JUNE 16, 1903.
J. E. GAMALIELSON.
CANE CART.
APPLICATION FILED MAR. 13, 1902.
NO MODEL.

ATTEST
R. B. Moore
T. M. Madden

INVENTOR
Johan E. Gamalielson

BY H. T. Fisher
ATTY

No. 730,901. Patented June 16, 1903.

UNITED STATES PATENT OFFICE.

JOHAN E. GAMALIELSON, OF KAUMANA, TERRITORY OF HAWAII.

CANE-CART.

SPECIFICATION forming part of Letters Patent No. 730,901, dated June 16, 1903.

Application filed March 13, 1902. Serial No. 97,985. (No model.)

*To all whom it may concern:*

Be it known that I, JOHAN E. GAMALIELSON, a citizen of the United States, residing at Kaumana, in the district of Hilo, Island of Hawaii, Territory of Hawaii, have invented certain new and useful Improvements in Cane-Carts; and I do declare that the following is a full, clear, and exact description of the invention, which will enable others skilled in the art to which it appertains to make and use the same.

My invention consists in a cane gathering and carrying cart substantially as shown and described, and particularly pointed out in the claims.

Figure 1:
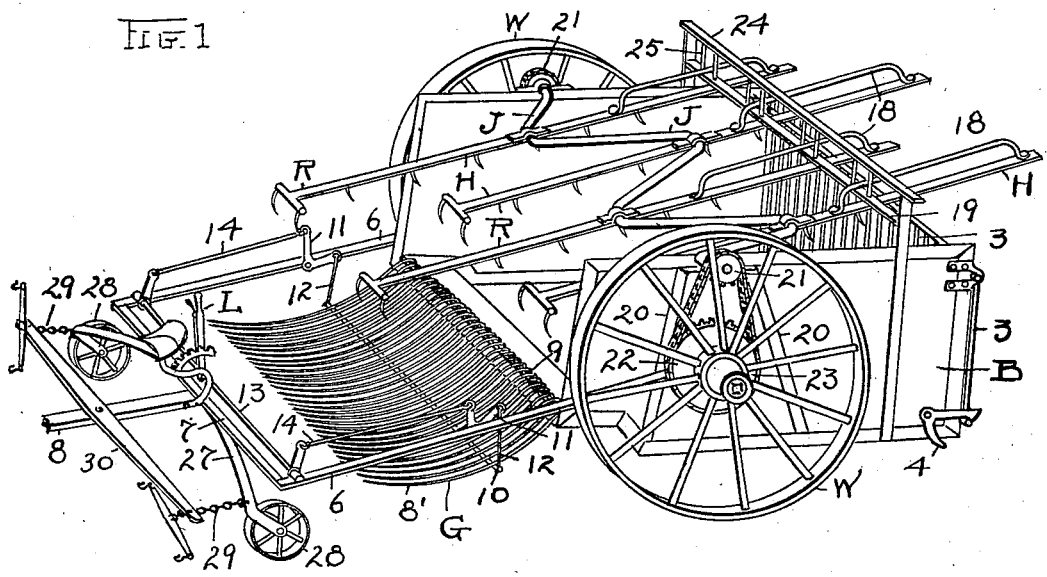
Figure 2:
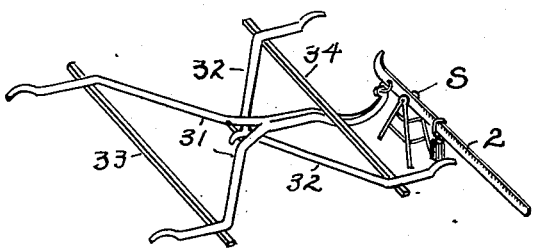

In the accompanying drawings, Figure 1 is a perspective view of my new cart complete and equipped for field work, and Fig. 2 is a perspective view of the weighing device adapted to be used in connection therewith and to weigh the cane on the cart.

This new cart in practical size is about five feet long front to rear, five feet wide between its sides, and three feet deep and of sufficient capacity to hold, say, one ton of green sugarcane; but it may be larger or smaller, if desired. Under the cart bed or box B there is a weighing attachment, Fig. 2, and said attachment is provided with a detachable and adjustable standard S, with a weighing balance 2 and a weight adaptable to be adjusted behind the cart in order to weigh the contents of the cart, after which the standard is removed and hung on the side of the cart and the cart tipped backward until it strikes the ground, when the tail-board 3, which hangs on hinges at its top on box B, opens automatically by the arm of catch 4 striking the ground or floor and allowing the contents to drop out behind, if desired.

The cart is provided with two shafts 6, one on each side, which extend about four feet six inches in front of the cart, where they are connected by a cross-bar 7. To the middle of said cross-bar is fastened a draft-pole 8, where two or more horses are to be hitched for the purpose of drawing and operating the cart.

At the front end of the cart is arranged a gatherer G, consisting of a series of steel rods or prongs forming lift-fingers which are supported on a steel rod 9, by which they have a free up-and-down or pivoted motion. Said prongs or fingers are further supported by cross-rod 10, beneath the same; bell-crank levers 11, pivoted on drafts 6 and connected by links 12 with said cross-rod; rock-shaft 13, having arms connected by links 14 with said bell-cranks, and a hand-lever L, fixed to said shaft near the driver's seat. The said prongs are curved to the shape of a segment of a circle, so as to follow the ground when lowered to about a foot from the point, and when the cart is drawn forward with the said gatherer with its relatively close or numerous fingers 8' under the cane or other substance that may be gathered it brings the same within reach of the system of rakes R, which take hold of the material and draw or drag it into the cart off the gathering-fingers. This system of rakes is an important part of the loading arrangement and consists of four or more bars H, of hickory or other light and strong material, which are hung on a crank-shaft J about midway their length and at their rear ends have keepers 18, by which they are confined in respect to cross-bar 19 of the cart-frame. The shaft J is supported in journals or boxes on the upper edges on the sides of the cart-body, which are strengthened on the sides of the body by braces 20, as shown in the drawings. On either end of the said shaft there is a sprocket-wheel 21 provided and a chain-belt 22 run around a sprocket-wheel 23, fastened on the inside of the hub of each wheel W of the cart. The rake-bars H run lengthwise of the cart with their rear ends confined by their keepers 18 and the bars 19 and 24 and side rounds 25. The rakes H are alternate in their strokes, as shown, and the raker-bars must be long enough to reach the cane on the gathering device G in front and are provided with a rake-head having two or more teeth, about one foot apart, whereby the cane is raked into the cart until it is full. Then the gatherer G is raised by the driver operating the lever L, the cart driven to its destination, and the contents weighed and dropped out behind or hoisted out of the cart, as the case may be. The cart is then ready again to proceed to the field, where it loads itself automatically as it is drawn forward, and so on continually, as already described.

Near the cross-bar 7, at the front of the shafts 6, is a curved axle or beam 27, with wheels 28 on its ends and adapted to support the forward portion of the cart and draft attachments. Chains 29 connect this shaft with the double-tree 30, and the draft-pole 8 is rigid therewith.

The weighing device is shown here as nearly the shape of a letter X, with a pivot at its middle for the bars 31 and 32 thereof and cross-bars 33 and 34 and goes in the bottom of the cart, as already described.

Something of the value of this invention may be estimated when it is considered that one man with two horses and one of these carts can do the work that it formerly took eight men, four horses, and two sleds to do. It also obviates the necessity of hauling all the cane to one place for weighing for a considerable distance around, and thereby causing the mud to be worked up in rainy weather, so that it was nearly impossible to work in rainy weather, when a derrick was used in weighing the cane. Now with this cart, having the weighing-scale under the bed of the cart, the weight of the contents of the cart can be ascertained at any time or place and the most convenient route to the destination followed without having all the sleds or carts meeting at one point to weigh the cane.

What I claim is—

1. In cane gathering and carrying carts, a box-shaped body and wheels supporting said body, a series of gathering-fingers running in advance of the said body to raise the cane thereinto, a draft-frame extending forward of said fingers, mechanism on said frame to raise and lower said fingers comprising a rod extending across beneath the fingers between their ends and an operating-lever on the front of said frame, substantially as described.

2. A cane-cart having a suitable body, a series of rake-bars and rakes to draw the cane into the cart, a crank-shaft carrying said bars and operatively connected with the wheels of the cart to actuate the same and means to confine the rear ends of said rake-bars comprising a supporting-frame having a cross-bar on which said rake-bars are slidably confined at their rear ends, in combination with a series of gathering-fingers supported at one end on said body, a frame projecting forward of said body and independent thereof, and means on said frame to raise and lower the front ends of said fingers substantially as described.

3. The cart and the draft-frame thereon and lift-fingers for the cane pivoted at its front and bottom, in combination with means to raise said fingers supported on said draft-frame, a driver's seat on the front of said frame, a lever connected with said means for lifting said fingers located in proximity to said seat, and a series of rakes on the cart to carry the cane off said fingers, substantially as described.

Witness my hand to the foregoing specification this 21st day of February, 1902.

JOHAN E. GAMALIELSON.

Witnesses:
JARRETT T. LEWIS,
I. A. HUTCHINSON.